United States Patent
Tamura et al.

(10) Patent No.: US 9,378,553 B2
(45) Date of Patent: Jun. 28, 2016

(54) STEREO IMAGE PROCESSING DEVICE FOR VEHICLE

(71) Applicant: FUJI JUKOGYO KABUSHIKI KAISHA, Tokyo (JP)

(72) Inventors: Yuichiroh Tamura, Tokyo (JP); Kensaku Natsume, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/667,265

(22) Filed: Mar. 24, 2015

(65) Prior Publication Data
US 2015/0279017 A1    Oct. 1, 2015

(30) Foreign Application Priority Data

Mar. 28, 2014 (JP) ................ 2014-069712

(51) Int. Cl.
*G06K 9/00* (2006.01)
*G06T 7/00* (2006.01)
*H04N 13/02* (2006.01)
*H04N 17/00* (2006.01)
*H04N 13/00* (2006.01)

(52) U.S. Cl.
CPC ............ *G06T 7/002* (2013.01); *G06K 9/00791* (2013.01); *H04N 13/0203* (2013.01); *H04N 13/0239* (2013.01); *H04N 17/002* (2013.01); *G06T 2207/10012* (2013.01); *G06T 2207/30252* (2013.01); *G06T 2207/30256* (2013.01); *H04N 2013/0081* (2013.01)

(58) Field of Classification Search
CPC .................. G06T 7/002; G06T 7/0075; G06T 2207/20228; A61B 6/022
See application file for complete search history.

(56) References Cited

U.S. PATENT DOCUMENTS

| | | | | | |
|---|---|---|---|---|---|
| 5,680,474 A | * | 10/1997 | Iijima | .................. | G06T 7/0022 345/419 |
| 6,813,370 B1 | * | 11/2004 | Arai | .................. | G06K 9/00798 340/908.1 |
| 6,906,620 B2 | * | 6/2005 | Nakai | ................ | G06K 9/00651 340/435 |
| 6,985,619 B1 | * | 1/2006 | Seta | .................. | G06K 9/00798 345/419 |
| 7,313,265 B2 | * | 12/2007 | Nakai | ..................... | G06T 7/002 382/104 |
| 8,050,458 B2 | * | 11/2011 | Azuma | .............. | G06K 9/00791 340/932.2 |

(Continued)

FOREIGN PATENT DOCUMENTS

| JP | 2003-083742 A | 3/2003 |
|---|---|---|
| JP | 2004-132870 A | 4/2004 |
| JP | 2007-037011 A | 2/2007 |

*Primary Examiner* — Avinash Yentrapati
(74) *Attorney, Agent, or Firm* — McDermott Will & Emery LLP

(57) ABSTRACT

In the lane line detection performed by a left-right similar object detection module, changes in brightness in the road width direction in a image plane are evaluated, a point group serving as a lane line candidate is extracted, and a lane line model is generated by calculating the parallax of left and right lane line candidate points and transforming the result into real space coordinates. A camera displacement diagnosis module determines a camera displacement by calculating a diagnostic value based on a difference between the parallaxes of the left and right lane lines in the same horizontal line between reference comparative images captured by a stereo camera unit. Where the camera displacement has occurred, a vehicle control device is instructed to stop the control function or make a transition to failsafe control, and a warning is issued instructing a user to take the vehicle to a maintenance site for inspection.

8 Claims, 12 Drawing Sheets

(56) References Cited

U.S. PATENT DOCUMENTS

| | | | | |
|---|---|---|---|---|
| 8,174,563 B2* | 5/2012 | Saito | | G01C 11/06 |
| | | | | 348/169 |
| 8,340,896 B2* | 12/2012 | Saito | | B60W 40/072 |
| | | | | 340/438 |
| 8,401,241 B2* | 3/2013 | Chandraker | | G06K 9/32 |
| | | | | 345/419 |
| 8,526,716 B2* | 9/2013 | Knee | | H04N 13/0003 |
| | | | | 382/154 |
| 8,878,944 B2* | 11/2014 | Tokunaga | | H04N 13/0246 |
| | | | | 348/187 |
| 9,245,345 B2* | 1/2016 | Wang | | G06T 17/05 |
| 2004/0096082 A1* | 5/2004 | Nakai | | G06K 9/00651 |
| | | | | 382/104 |
| 2004/0234124 A1* | 11/2004 | Nakai | | G06T 7/002 |
| | | | | 382/154 |
| 2010/0098293 A1* | 4/2010 | Chandraker | | G06K 9/32 |
| | | | | 382/103 |
| 2012/0257018 A1* | 10/2012 | Shigemura | | G02B 27/2214 |
| | | | | 348/46 |
| 2014/0133741 A1* | 5/2014 | Wang | | G06T 17/05 |
| | | | | 382/154 |

* cited by examiner

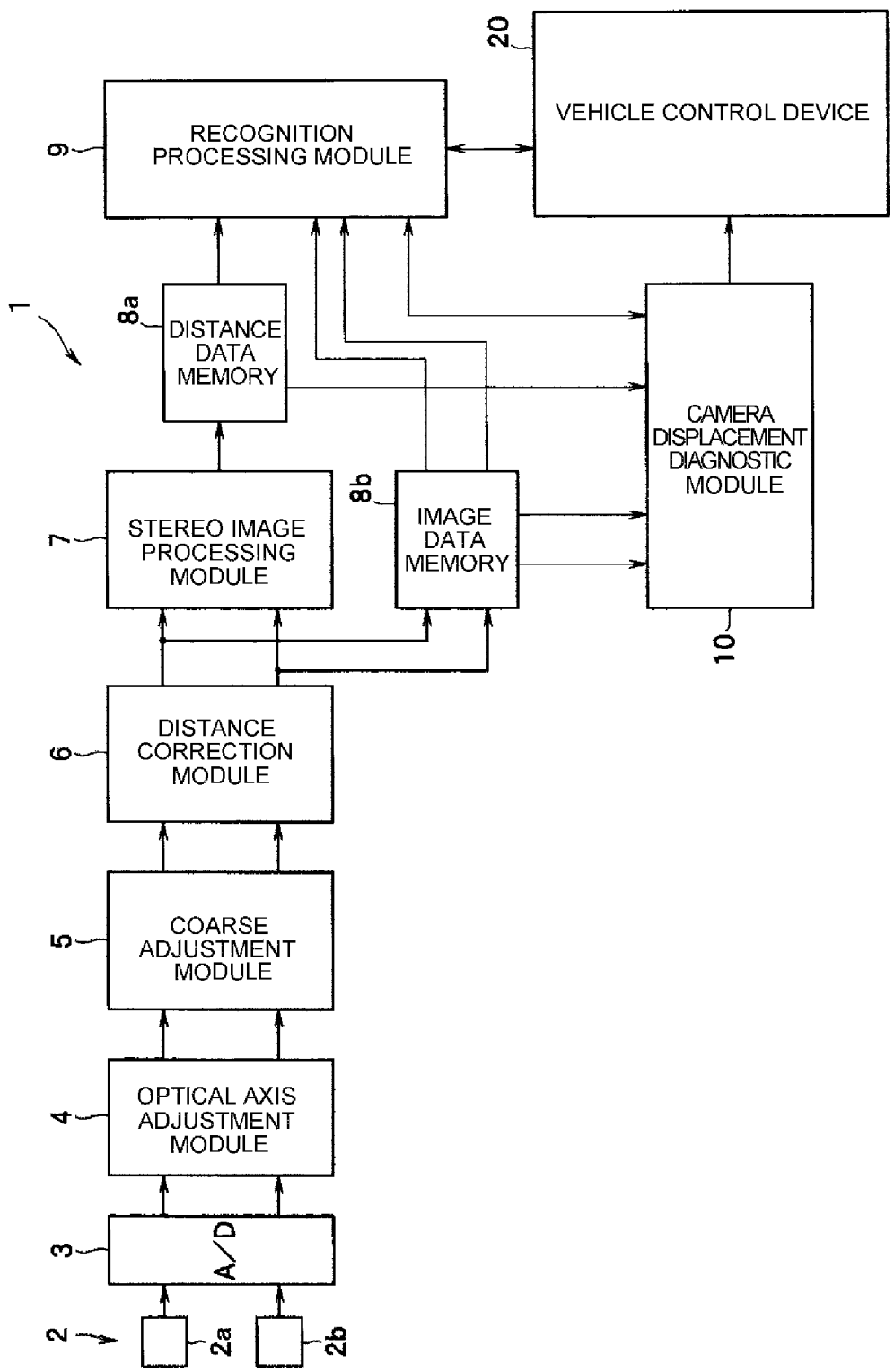

STEREO IMAGE PROCESSING DEVICE FOR VEHICLE

CROSS-REFERENCE TO RELATED APPLICATIONS

The present application claims priority from Japanese Patent Application No. 2014-069712 filed on Mar. 28, 2014, the entire contents of which are hereby incorporated by reference.

BACKGROUND

1. Technical Field

The present invention relates to a stereo image processing device for a vehicle that processes an image captured by a stereo camera unit installed on the vehicle and three-dimensionally recognizes a traveling environment.

2. Related Art

The technique of capturing a traveling environment in front of a vehicle with a camera and recognizing the traveling environment by image processing has recently found application in vehicles such as automobiles. In particular, various types of driver assist control methods such as collision avoidance with respect to forward obstacles, tracking control with respect to a vehicle in front, and warning control and steering control relating to wobbling and lane departure have been implemented by using a stereo image processing technique of capturing the same object with a stereo camera from different visual points and three-dimensionally recognizing the object from the parallax (distance data) obtained.

Such a stereo camera unit is configured, for example, by mechanically fixing a pair of cameras with a predetermined base line (distance between optical axes) such that the optical axes thereof are substantially parallel, and where the mounting position thereof is shifted, the image capturing directions of the cameras are shifted, the vehicle in front cannot be recognized, and the accuracy of distance data is degraded.

For this reason, Japanese Unexamined Patent Application Publication No. 2004-132870 (JP 2004-132870 A) discloses the technique for improving the reliability of distance data by disposing an adjustment chart in front of a stereo camera unit, processing the captured image of the adjustment chart, and adjusting the displacement of the stereo camera unit.

However, with the conventional technique such as disclosed in JP 2004-132870, the presence of a stereo camera displacement is examined and the adjustment is performed on a stationary vehicle during inspection at a production plant upon shipping of the vehicle or at a maintenance site such as a dealership, and it is difficult to determine whether or not displacement has occurred in a stereo camera unit under the actual usage conditions.

SUMMARY OF THE INVENTION

With the foregoing in view, it is an objective of the present invention to provide a stereo image processing device for a vehicle that can diagnose the displacement in a stereo camera unit when the vehicle is running and can avoid the occurrence of vehicle control failures resulting from erroneous recognition caused by the displacement.

A stereo image processing device for a vehicle in accordance with the present invention processes images captured by a stereo camera unit installed on the vehicle and three-dimensionally recognizes a traveling environment, the device including: a left-right similar object detection module that detects a left side object and a right side object which is similar to the left side object present as a pair on the left and right side of the vehicle from an image captured by the stereo camera unit, performs matching processing of the left side object and the right side object, and calculates a parallax of the left side object and a parallax of the right side object on a same horizontal line of the image; and a camera displacement diagnosis module that calculates a diagnostic value based on a difference between the parallax of the left side object and the parallax of the right side object on the same horizontal line, compares the diagnostic value with a preset threshold value, and diagnoses a mechanical displacement in the stereo camera unit.

BRIEF DESCRIPTION OF THE DRAWINGS

FIG. 1 is a configuration diagram of a stereo image processing device for a vehicle;

DETAILED DESCRIPTION

Figure 2A:
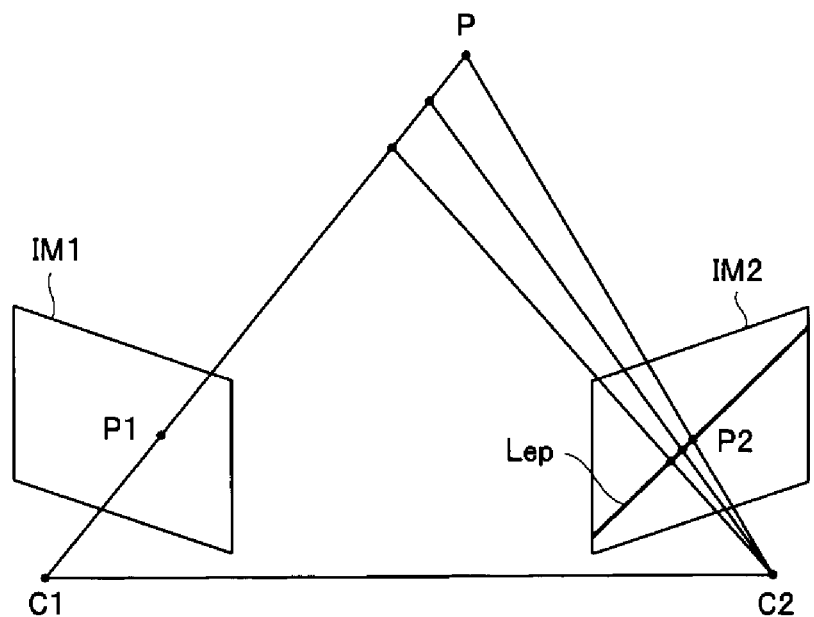
FIGS. 2A-2B are explanatory drawings illustrating an epipolar line.

An embodiment of the present invention will be explained hereinbelow with reference to the appended drawings.

In FIG. 1, the reference numeral 1 stands for a stereo image processing device that is installed on a vehicle (hereinafter referred to as "subject vehicle") such as an automobile, processes an image captured by a stereo camera unit 2 that captures an object from different visual points, measures the three-dimensional position of the object, and three-dimensionally recognizes the traveling environment around the subject vehicle. The stereo image processing device 1 includes, as functional components relating to processing of the image captured by the stereo camera unit 2, an A/D conversion module 3, an optical axis adjustment module 4, a coarse adjustment module 5, a distance correction module 6, a stereo image processing module 7, and a recognition processing module 9 as the main components, and also a distance data memory 8a and an image data memory 8b.

The stereo image processing device 1 is also provided with a camera displacement diagnosis module 10 as a functional component for detecting the mechanical displacement of the stereo camera unit 2 that occurs during the actual use. In the present embodiment, the stereo camera unit 2 is configured of a set of mutually synchronized cameras 2a and 2b which have image capturing elements such as CCD or CMOS and a variable shutter speed. The three-dimensional position of an object on the outside of the subject vehicle is measured by performing stereo image processing of the image captured by the cameras 2a and 2b and relating to the outside of the subject vehicle.

It is well known that the measurement of the three-dimensional position of an object by a stereo method is based on stereo matching (corresponding point search) that involves determining the correspondence positions of the same point on two images with respect to two images captured by the cameras 2a and 2b. This corresponding point search is typically implemented as one-dimensional search on an epipolar line.

Thus, as depicted in FIG. 2A, where the cameras 2a and 2b are represented by camera modules, the visual points thereof (lens centers) are denoted by C1 and C2, respectively, and the projection planes (image planes) thereof are denoted by IM1 and IM2, respectively, when the attention is focused on a point P in a three-dimensional space, the point P of interest is observed in a point P1 on the projection plane IM1 of the camera 2a and in a point P2 on the projection plane IM2 of the camera 2b.

In the corresponding point search, a point corresponding to the point P1 on one projection plane IM1 is searched from the other projection plane IM2, but a point on the projection plane IM2 corresponding to the point P1 is on a straight line Lep (epipolar line) where the projection plane IM2 crosses a plane constituted by the points P1, C1, and C2 due to the geometric relationship of camera arrangement. The epipolar line Lep is likewise also present on the projection plane IM1, and the corresponding point search returns to one-dimensional search on the epipolar line Lep.

Figure 2B:
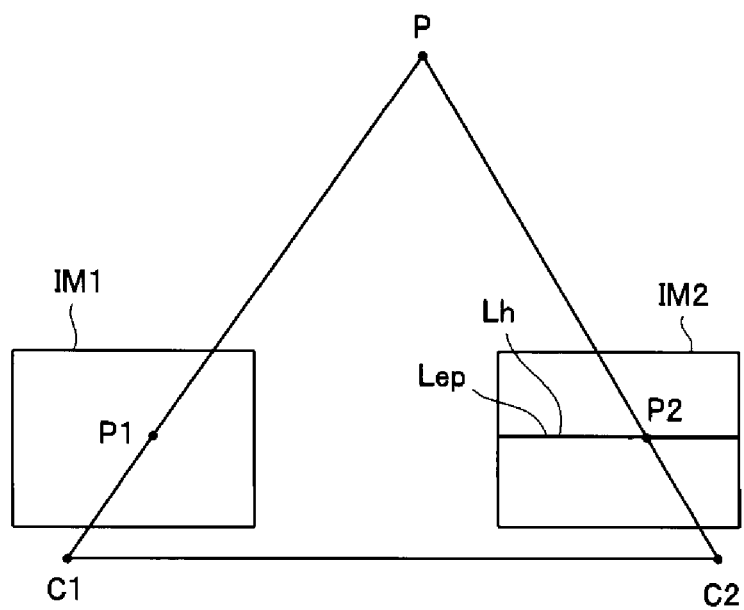

In this case, the search processing can be simplified by matching the epipolar line Lep with a scanning line of the image. Therefore, in the present embodiment, as depicted in FIG. 2B, the projection planes IM1 and IM2 of the cameras 2a and 2b are arranged parallel to each other, and the two epipolar lines Lep are matched with a horizontal scanning line Lh of the image.

More specifically, the stereo camera unit 2 is mechanically and electrically adjusted so as to obtain a camera arrangement such that the optical axes of the camera 2a disposed on the right side in the horizontal direction and the camera 2b disposed on the left side are parallel to each other, the image capturing planes match, and the abscissa directions (horizontal scanning line directions) of the image capturing planes are matched (are not rotated with respect to each other). Such a stereo camera unit 2 is formed as a camera module in which the two cameras 2a and 2b are fixed to obtain a predetermined base length and is disposed, for example, close to a room mirror on the inner side of the front window at the upper part inside the vehicle cabin.

In the present embodiment, the right camera 2a captures a reference image which serves as a reference for the corresponding point search, and the left camera 2b captures a comparative image for performing the corresponding point search. The right camera 2a that captures the reference image (right image) is referred to hereinbelow, as appropriate, as the main camera 2a, and the left camera 2b that captures the comparative image (left image) is referred to as the sub-camera 2b.

The images captured by the cameras 2a and 2b are converted by an A/D conversion module 3 into respective digital images with a predetermined brightness gradation (for example, a 256-gradation gray scale). The digitalized image data are represented in an i-j coordinate system having the lower left corner of the image as a point of origin, the horizontal direction as an i-coordinate axis, and the vertical direction as a j-coordinate axis, reference image data are obtained from the main camera 2a, and comparative image data are obtained from the sub-camera 2b.

The optical axis adjustment module 4 adjusts the position of the processing area to be used for recognition. As for the mounting position of the stereo camera unit 2, the orientation of the optical axes (orientation of image center) with respect to the vehicle body unavoidably spreads in the pitch direction and yaw direction between the pair of cameras 2a and 2b due to a spread between vehicles. Therefore, the processing area which is the object of recognition processing of the areas captured by the cameras is moved, for example, by using a calibration parameter calculated by capturing the adjustment chart at the time of delivery from the plant, and the shift of optical axes of the cameras is corrected.

The calibration parameter serves for calibrating the shift in the optical axis direction of the recognition area of the image which is caused by the positional displacement of the cameras 2a and 2b and the translational-rotational shift of a pair of image data, and the optical axis adjustment module 4 causes parallel movement of the recognition area of a preset size by a predetermined movement amount in the yaw direction and pitch direction in the image capture area of each camera.

The coarse adjustment module 5 compensates the displacement between the cameras 2a and 2b that cannot be compensated by the mechanical adjustment at the time the camera unit is manufactured. For example, the translational and rotational shift of the image of the sub-camera 2b with respect to the image of the main camera 2a is examined and the parameters of affine transformation are stored in a memory at the time of delivery from the plant. The translational and rotational displacement of the image captured by the sub-camera 2b with respect to the image captured by the camera 2a is then corrected by geometrically moving the image of the sub-camera 2b by the predetermined translation amount and rotation angle by using the affine transformation parameters.

The distance correction module 6 corrects the reference image data and comparative image data to correct the distortion of image data caused by optical distortion of the camera. More specifically, the coordinates of pixel points constituting the image data of the reference image and comparative image are shifted on the image plane on the basis of the correction parameter that has been calculated in advance. Such correction basically results in the correction of image distortions caused by optical distortions of individual cameras 2a and 2b and the correction of errors in the distance data caused by such distortions.

The correction parameter is determined, for example, by the difference between the coordinate on the image plane of a feature point detected from the adjustment chart captured at the time of delivery from the plant and a target coordinate corresponding to the feature point. In this case, the target coordinate, as referred to herein, is a coordinate detected when the adjustment chart is captured by an ideal camera which has absolutely no optical distortions. The target coordinate can be calculated, for example, on the basis of the adjustment chart pattern, the distance between the adjustment chart and the camera, and the focal distance of the camera.

Matching of the epipolar lines in the reference image and comparative image is ensured by the calibration of the image data in the optical axis adjustment module 4 and coarse adjustment module 5 and the correction of image data in the distance correction module 6. A pair of image data corresponding to one frame is outputted to the stereo image processing module 7 of the last stage and stored in the image data memory 8b.

The stereo image processing module 7 determines the shift amount (parallax) of the corresponding positions of the reference image and comparative image by stereo matching processing. For example, a well-known area search method can be used as the stereo matching processing to estimate the correlation degree of the reference image and comparative image. In the present embodiment, a sum (SAD: Sum of Absolute Difference) of difference (absolute value) in pixel values between a small area (block) of the reference image and a small area (block) of the comparative image is calculated as an evaluation function of the correlation degree. A brightness value of each pixel is often used as the pixel value.

The value of the evaluation function determined by the SAD is called the "city block distance", and the value of the city block distance decreases with the increase in correlation between the blocks (degree of similarity). The parallax is given by the shift amount in the horizontal direction between the blocks at which the city block distance takes a minimum value. The city block distance CB can be obtained by defining a position on an image plane in orthogonal coordinates in which the horizontal direction is taken as an i-coordinate and the vertical direction is taken as a j-coordinate, taking the blocks for which the degree of correlation is to be sought as i×j (i=0 to n; j=0 to n) search blocks, and calculating the SAD value of a search block M(i, j) of the reference image and a search block S(i, j) of the comparative image, while performing shifting by a predetermined shift value on the T-axis (epipolar line), as indicated in Equation (1) below.

$$CB = \Sigma |M(i,j) - S(i,j)| \quad (1)$$

Figure 3:
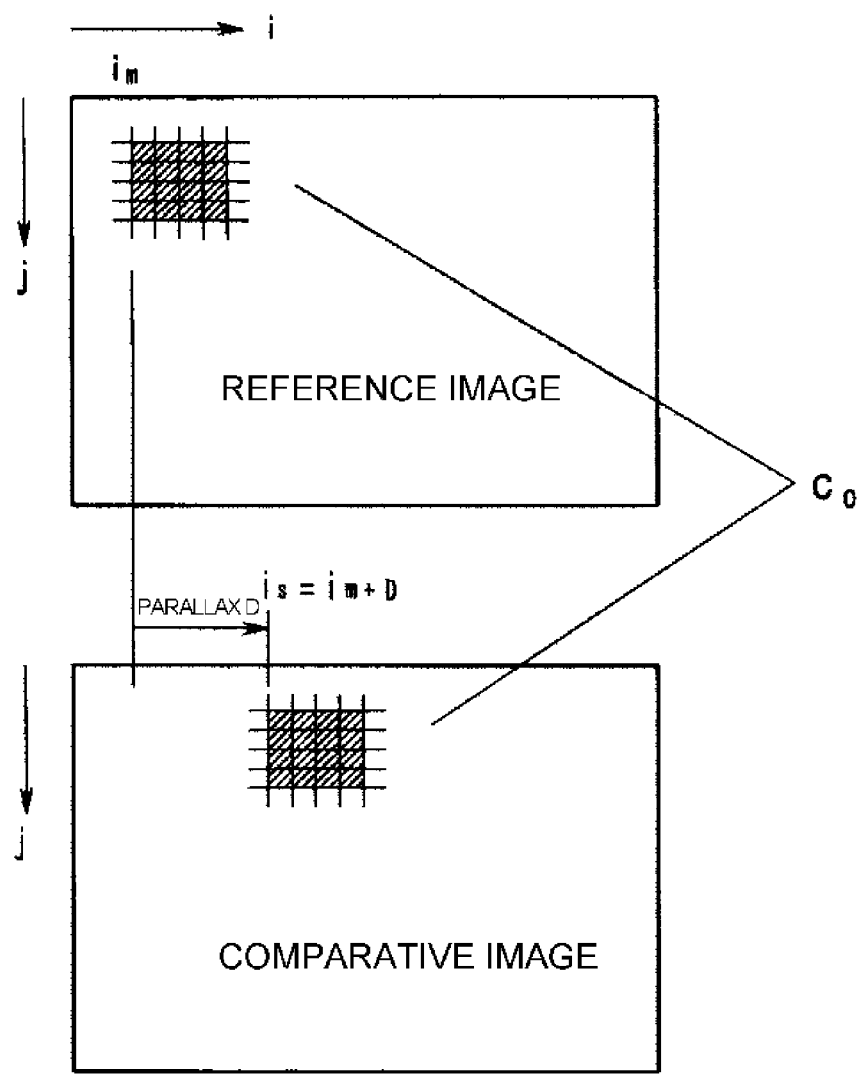
FIG. 3 is an explanatory drawing illustrating stereo matching.

In the aforementioned SAD calculation, for example, where a search block constituted by 4×4 pixels is taken as an object and SAD calculations are performed by shifting the position of the search block (sub-block) of the comparative image by one pixel on the horizontal scanning line with respect to the search block (main block) of the reference image, a point in which the city block distance takes a minimum value C0 is determined, as depicted in FIG. 3, as a corresponding position (matching point) in which the degree of correlation of the main block and sub-block is the highest. The shift amount (the difference between the position im of the main block and the position is of the sub-block in the horizontal scanning direction) in one-pixel units of the main block and the sub-block in the matching point gives the parallax d (pixel parallax) having a resolution of one-pixel unit, and the aggregation of parallaxes d calculated for each block is saved as the distance data forming the distance image in the distance data memory 8a.

The distance information base on the pixel parallax is such that the resolution decreases as the distance to the object increases. Therefore, the processing of determining the parallax at a sub-pixel level of resolution which is equal to or less than one-pixel unit is performed as necessary.

The recognition processing module 9 obtains the distance in the real space and also performs the recognition processing of each type by using the distance data saved in the distance data memory 8a. For example, grouping processing is performed to group the distance data within a predetermined threshold, and lane line data relating to the road and side-wall data relating to guard rails and curbs present along the road are extracted, and steric objects are classified into bicycles, ordinary vehicles, large vehicles, pedestrians, utility poles, and other steric object and extracted.

The positions for the recognized data are calculated in three-dimensional coordinates of the real space. More specifically, where the points on the road surface directly below the centers of the main camera 2a and the sub-camera 2b are taken as points of origin in the real space, the X-axis is taken in the width direction, that is, left-right direction, of the subject vehicle, the Y-axis is taken in the vehicle height direction, and the Z axis is taken in the subject vehicle length direction, that is, distance direction, a point (i, j, d) on the distance image can be coordinate-converted into a point (x, y, z) in the real space by the following Equations (2) to (4) based on the principle of triangular measurements.

$$x = CD/S + z \cdot wi \cdot (i - iv)/f \quad (2)$$

$$y = z \cdot wj \cdot (j - jv)/f + CAHM \quad (3)$$

$$z = CD \cdot f/(d \cdot wi) \quad (4)$$

where CD: camera spacing (base length);
CAHM: height of the camera center (lens center) above the point of origin;
f: focal distance of the lens;
d: parallax (number of pixels);
wi: pixel pitch (horizontal direction);
iv: optical axis position (i-coordinate of the infinitely remote point on the front surface of the subject vehicle);
wj: pixel pitch (vertical direction); and
jv: optical axis position (j-coordinate of the infinitely remote point on the front surface of the subject vehicle).

In the vehicle data relating to bicycles, usual vehicles, and large vehicles, the length thereof in the front-rear direction is estimated in advance, for example, as 3 m, 4.5 m, and 10 m, respectively, and the central position in the width direction where the vehicle is present is calculated using the central position of the detected width. Further, in the steric data the speed relative to the subject vehicle is calculated from changes in the distance in the direction of each axis from the subject vehicle, and the speed of each steric object in each axial direction is calculated by taking the subject vehicle speed into account in the calculated relative speed.

The moving object such as pedestrians and light vehicles located around the subject vehicle and other vehicles traveling on a road connected to the road where the subject vehicle travels are recognized from the information thus obtained, that is, the lane line data relating to the road, side-wall data relating to guard rails and curbs present along the road, and steric object data (type, distance from the subject vehicle, coordinates of central position, speed, etc.). Such lane line data, side-wall data relating to guard rails and curbs present along the road, and steric object data from the recognition processing module 9 are inputted to the vehicle control device 20. The vehicle control device 20 issues an instruction to perform driver assist control such as pre-crush brake control that prevents collision with an obstacle, cruise control provided with a tracking function, and warning control and steering control relating to wobbling and lane departure on the basis of information from the recognition processing module 9.

In such driver assist control, it is important to determine accurately the three-dimensional position of the object. Therefore it is necessary to maintain the positional accuracy of the stereo camera unit 2 at the time of shipping by periodic maintenance or the like. However, where the subject vehicle is exposed to severe traveling conditions such as vibrations caused by poor roads or where periodic maintenance is not performed, the cameras 2a and 2b constituting the stereo camera unit 2 are displaced with respect to each other, the three-dimensional positions of objects are difficult to determine accurately, and controllability can be degraded.

In particular, in cruise control or lane departure prevention control based on the lane line recognition result, the shape of the lane line on the road is difficult to recognize accurately, and the control itself can collapse. Therefore, the camera displacement diagnosis module 10 determines whether or not a rotational or translational displacement has occurred between the cameras 2a and 2b constituting the stereo camera unit 2, and when it is determined that the displacement has occurred, safety is ensured by transition to fail-safe control or by stopping the related functions of the vehicle control system based on the traveling environment recognition result obtained by stereo image processing.

The system may be restored when a state with normal diagnostic results is maintained for a predetermined period of time after it has been determined that the camera displacement has occurred under the effect of noise or the like in the diagnostic process and the related functions of the vehicle control system have been stopped.

The displacement between the cameras 2a and 2b can be detected by using an object serving as a reference in the traveling environment. A fixed object associated with the road can be considered as the reference object, and among them, objects disposed to form a pair on the left and right side of the subject vehicle on the road where the subject vehicle travels, for example, left and right lane lines on the road surface, left and right guard rails, and left and right curbs (side walls) can be used.

With such left and right objects, in the stereo image processing of the present embodiment in which the epipolar line is matched with the horizontal scanning line (horizontal line), the portions at the same distance are picked up on the same horizontal line. Therefore, where objects forming a pair are present on the left and right side, it is possible to determine whether or not a displacement has occurred between the cameras 2a and 2b by comparing the parallaxes of the left and right objects on the same horizontal line.

In particular, lane lines are the objects of a comparatively high brightness that are present on the road surface, and in most cases, they can be detected as a left-right pair, without the effect of occlusion or the like. Therefore, in the present embodiment, the displacement between the cameras 2a and 2b is diagnosed with reference to the fact that the left and right lane lines present at the same distance are picked up on the same horizontal line under the normal circumstances.

The lane line used for camera displacement diagnostic in the present embodiment is a general name for lines dividing the vehicle traffic zone where the subject vehicle travels and is inclusive of single lines, multiple lines such as double lines, solid lines, and broken lines yellow lines and white lines. The lane lines detected on both sides (left and right) of the subject vehicle are taken as a reference for diagnostic.

The left and right lane line detection function of the stereo image processing module 7 and the recognition processing module 9, that is, the function thereof as the left-right similar object detection module of that detects a left side object and a right side object, is explained hereinbelow. The lane line of a road can be detected by estimating changes in brightness in the width direction to the road in the image plane, extracting a point group serving as a candidate for a lane line, and processing the time sequence data of the point group which is the lane line candidate.

Figure 4:
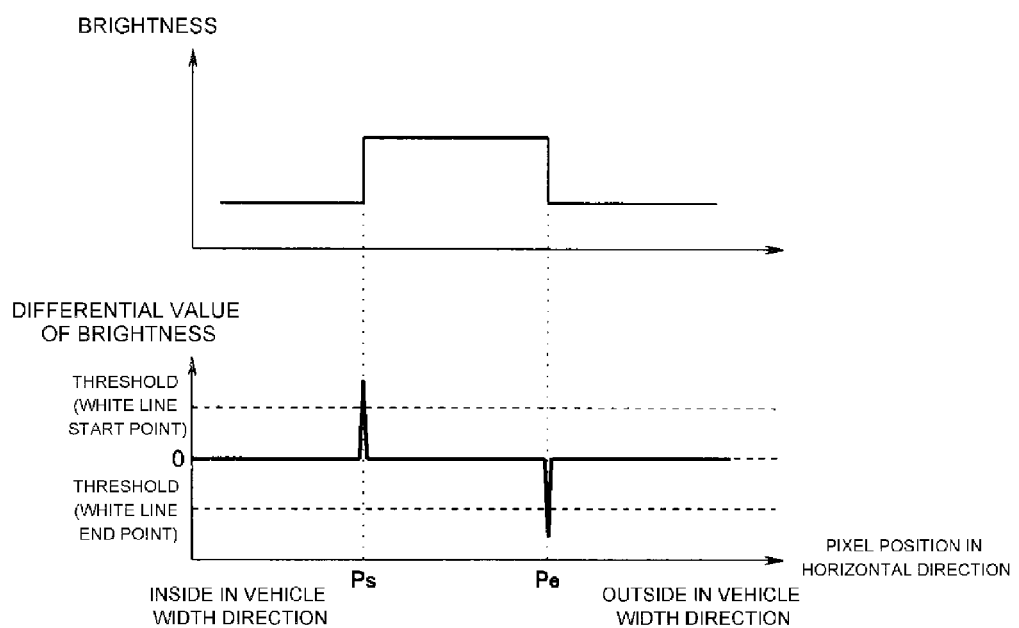
FIG. 4 is an explanatory drawing illustrating lane line detection.

For example, as shown in FIG. 4, the search is performed from the inside outward in the vehicle width direction on the image plane, and a point (edge point) in which the brightness of pixels on the outer side in the vehicle width direction is high relative to the brightness of pixels on the inner side and the differential value of the brightness representing the variation amount thereof is equal to or higher than a set threshold on the positive side is detected as a lane line start point Ps. Further, a point (edge point) in which the brightness of pixels on the outer side in the vehicle width direction is low relative to the brightness of pixels on the inner side and the differential value of the brightness representing the variation amount thereof is equal to or less than a set threshold on the negative side is detected as a lane line end point Pe.

A predetermined intermediate area between the lane line start point Ps and the lane line end point Pe is extracted as a lane line candidate points, and the parallax of the lane line candidate points determined by stereo matching is converted into coordinates in the real space. A lane line model approximating the left and right lane lines is calculated by processing the time sequence data relating to the space coordinate positions of the lane line candidate point based on the vehicle movement amount per unit time. In the present embodiment, an approximation model representing the height on the YZ plane is added to the approximation model representing the shape on the XZ plane in the XYZ coordinate space as a lane line model, and the lane lines can thus be three-dimensionally determined.

The lane line shape of the XZ plane can be represented, for example, by using an approximation model in which linear components determined by the Hough transformation are connected to each other, or an approximation model in which x-direction positions xl and xr of the left and right lane lines are approximated by a second-order equation with respect to the distance z, as indicated in Equations (5) and (6) hereinbelow.

$$xl = Al \cdot z^2 + Bl \cdot z + Cl \quad (5)$$

$$xr = Ar \cdot z^2 + Br \cdot z + Cr \quad (6)$$

The coefficients Al, Bl, Cl, Ar, Br, and Cr in Equations (5) and (6) are identified using a least squares method with respect to the real space coordinates (x, z) of the left and right lane line candidate points. The coefficients Al and Ar represent curvature components of the left and right lane lines, respectively, the coefficients Bl and Br represent inclination components (yaw angle components) of the left and right lane lines, respectively, in the width direction of the subject vehicle, and the coefficient Cl and Cr represent position components of the left and right lane lines, respectively, in the width direction of the subject vehicle.

The heights yl, yr of the left and right lane lines on the YZ plane can be determined by linear approximation with first-order equations with respect to the distance z as indicated by Equations (7) and (8) below. The coefficients al, ar, bl, and br are identified using a least squares method with respect to the real space coordinates (x, z) of the left and right lane line candidate points.

$$yl = al \cdot z + bl \quad (7)$$

$$yr = ar \cdot z + br \quad (8)$$

With respect to such lane lines, the camera displacement diagnosis module 10 determines the presence of a camera displacement by calculating a diagnostic value based on the difference in the parallax of the left lane line and the parallax of the right lane line between the reference image and comparative image. Where it is determined that a camera displacement has occurred, the lane line model calculated in the recognition processing module 9, or position information on other vehicles or the like is erroneous information based on erroneous recognition. Therefore, an instruction is issued to stop the control function in the vehicle control device 20 or make a transition to failsafe control. Further, a warning is issued to the user to take the car to the maintenance site of the dealership for inspection.

Whether or not a displacement has occurred is determined by using the diagnostic value based on the difference in parallax between the left and right lane lines on the same horizontal line. More specifically, the diagnostic values such as described in sections (a) to (c) hereinbelow are calculated, and whether or not a displacement has occurred is determined by using those diagnostic values individually or in appropriate combinations. For the sake of simplicity, in the example explained hereinbelow, the case is considered in which the road is flat, the subject vehicle travels on the straight road of a constant width, the vehicle position (camera position) is in the center between the left and right lane lines, and the subject vehicle is parallel to the left and right lane lines.

Figure 5:
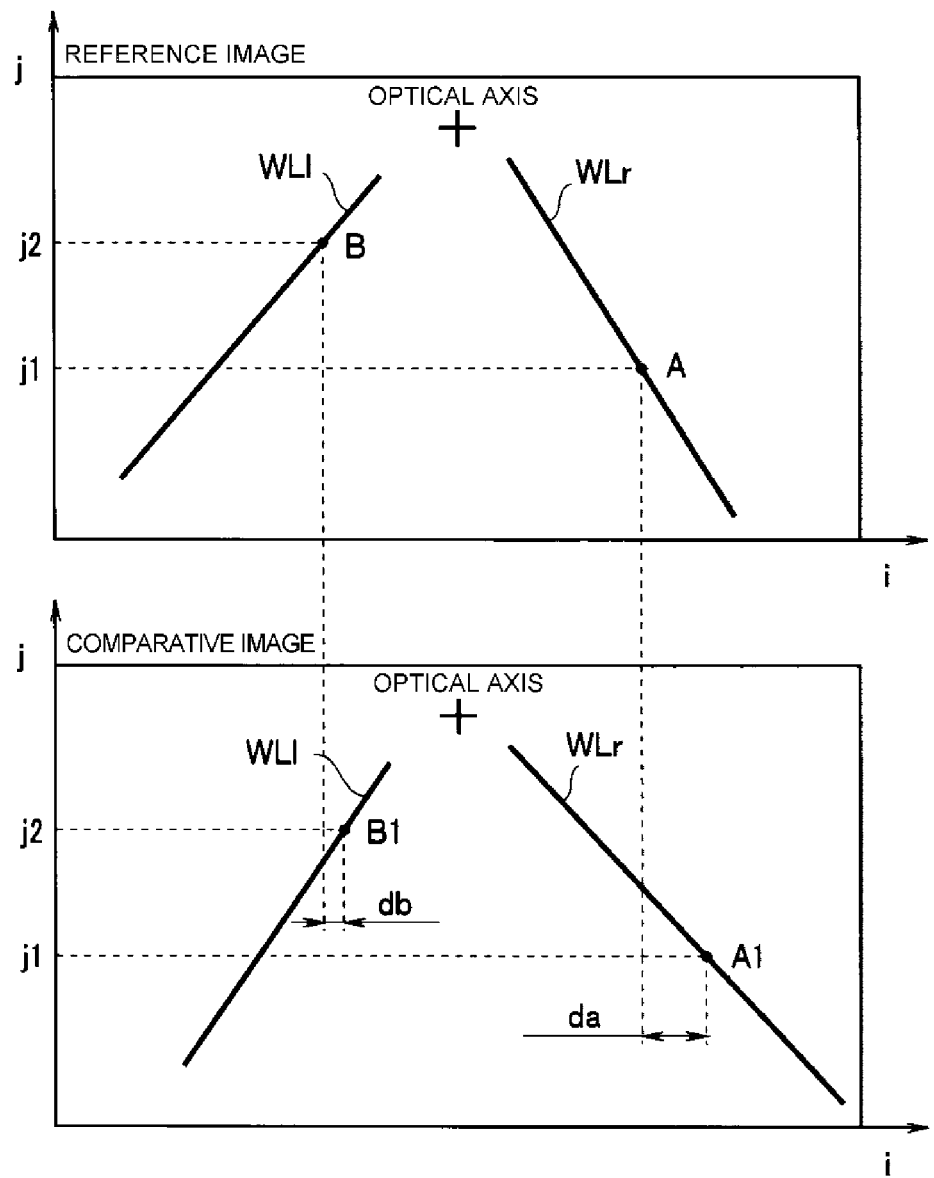
FIG. 5 is an explanatory drawing illustrating the positions of lane lines in a reference image and a comparative image.

(a) Diagnostic value determined by difference between image coordinate values of left and right lane lines giving the same parallax Where no displacement is present between the cameras 2a and 2b, as depicted in FIG. 5, the left and right lane lines WLl and WLr are picked up with a shift in the horizontal direction equal to the parallax of the reference image of the camera 2a and the comparative image of the camera 2b. In this case, where a ground point A on the right lane line WLr with the coordinate j1 of the reference image and a ground point B on the left lane line WLl with the coordinate j2 (j2>j1) in FIG. 5 are taken as points of interest, the ground point A close to the camera 2a is picked up at a position below the image, and the ground point B which is far from the camera 2a is picked up above (close to the optical axis of) the image.

Figure 6:
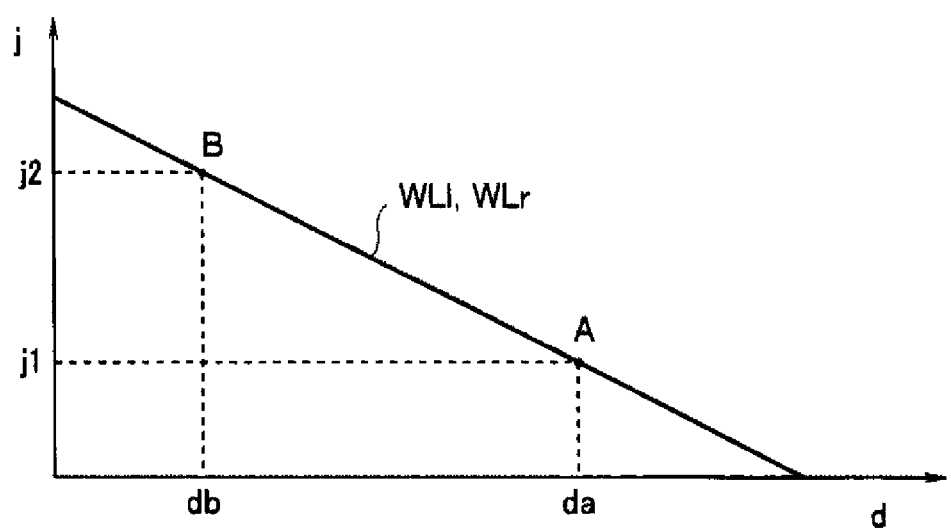
FIG. 6 is an explanatory drawing illustrating a parallax of left and right lane lines determined from the reference image and comparative image depicted in FIG. 5.

By contrast, in the comparative image, the ground point A is picked up at a position Al on the right lane line WLr which is shifted by the parallax da in the horizontal direction (i-axis direction) at the coordinate j1, and the ground point B is picked up at a position Bl on the left lane line WLl which is shifted by the parallax db in the horizontal direction (i-axis direction) at the coordinate j2. FIG. 6 depicts such a relationship represented as a relationship between the vertical coordinate (j-coordinate) of the image and the parallax d.

In FIG. 6, the parallax da of the ground point A satisfies the relationship da>db with the parallax db of the ground point B, and the parallax of the left lane line WLl and the parallax of the right lane line WLr have the same value in the same ground point (on the horizontal line with the same j-coordinate value). In other words, the j-coordinate of the left lane line WLl and the j-coordinate of the right lane line WLr giving the same parallax value have the same value. Where lane line approximating equations are generated (see the above-describes equations (2) to (6)) by calculating the distance z in the real space and the coordinate value x in the vehicle width direction by using the parallax values satisfying such a relationship, the lane line position such as shown in FIG. 7 is calculated.

Figure 7:
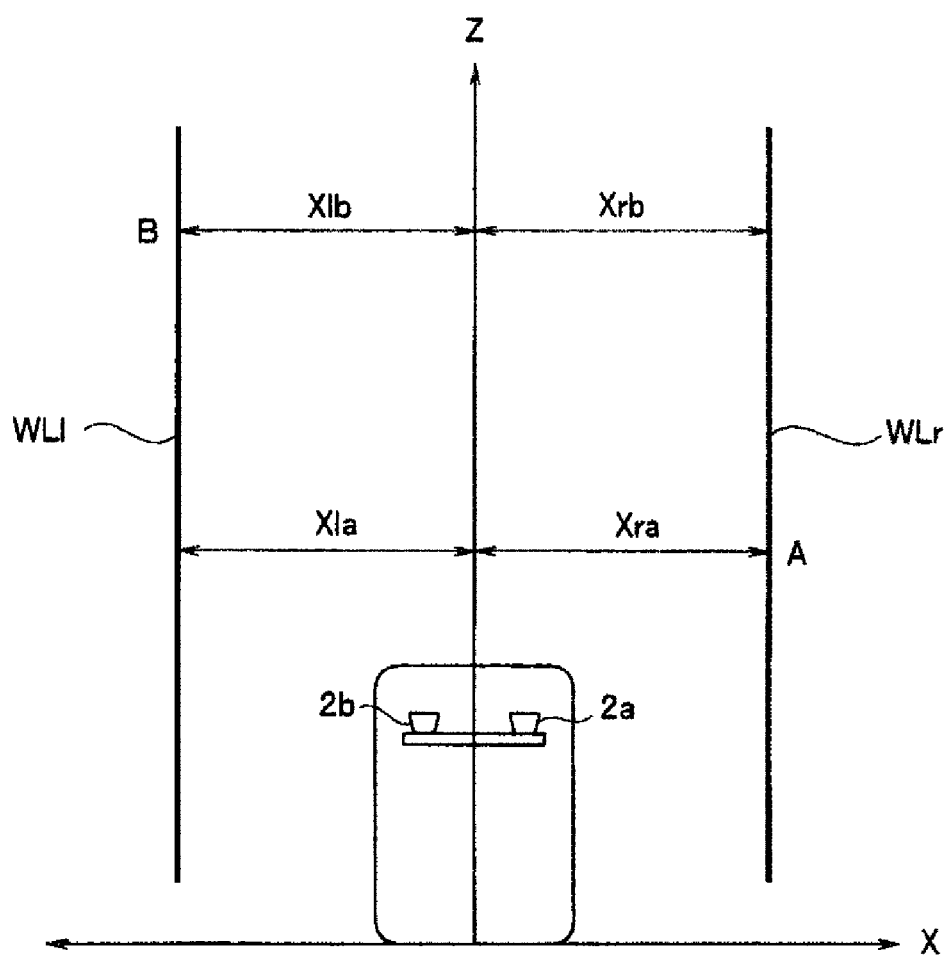
FIG. 7 is an explanatory drawing illustrating lane lines recognized from the reference image and comparative image depicted in FIG. 5.

In FIG. 7, since the camera position is not shifted, the transverse positions Xla and Xra from the vehicle center (center of cameras 2a and 2b) in the ground point A to the left lane line WLl and right lane line WLr, respectively, and the transverse positions Xlb and Xrb from the vehicle center in the ground point B to the left lane line WLl and right lane line WLr, respectively, all have the same value (Xla=Xra=Xlb=Xrb), and it is clear that the lane line is accurately recognized.

Figure 8:
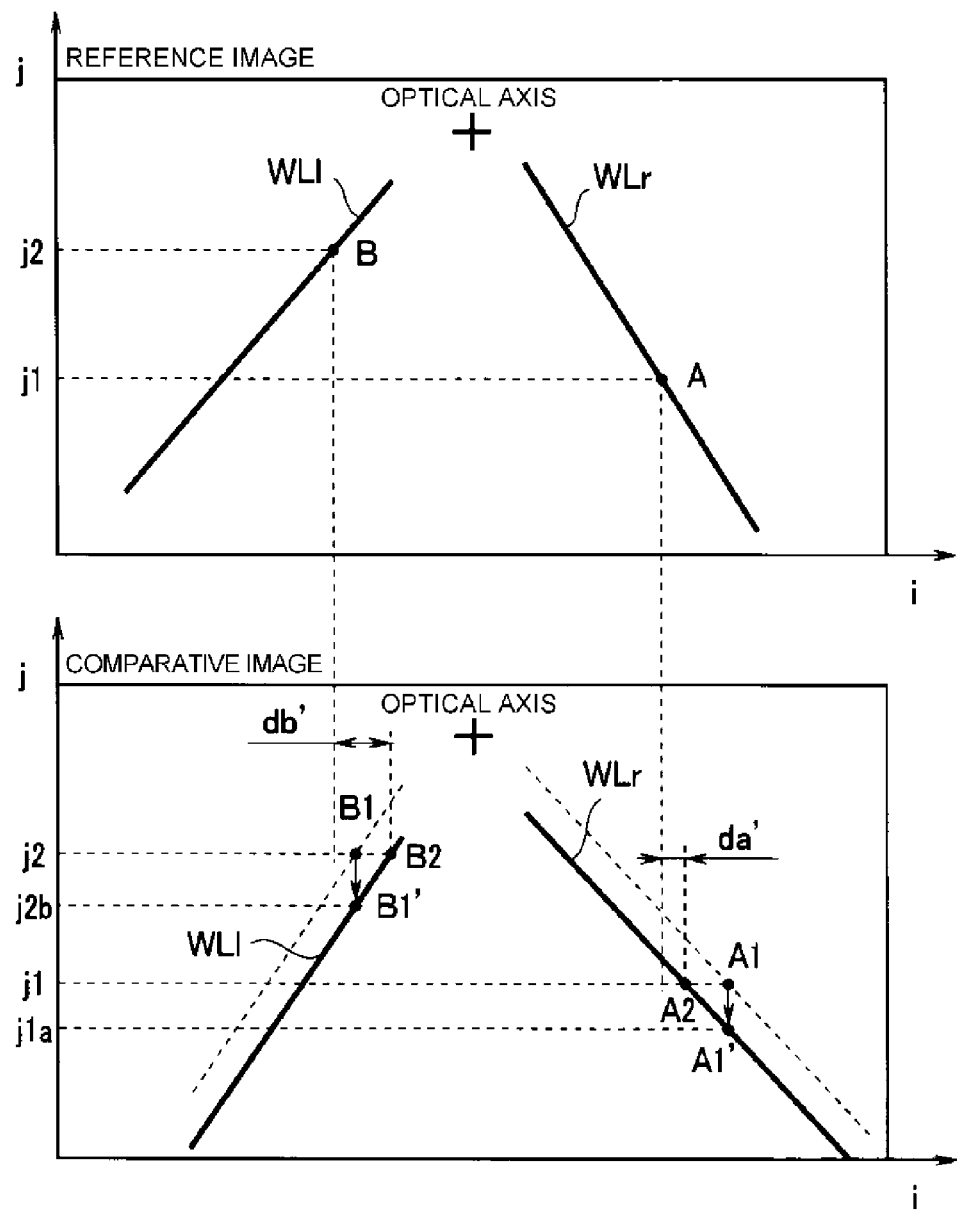
FIG. 8 is an explanatory drawing illustrating the positions of lane lines in a reference image and a comparative image in the case in which a camera displacement has occurred.

Meanwhile, where a displacement has occurred between the cameras 2a and 2b, for example, when the camera 2b has shifted upward with respect to the camera 2a, as shown in FIG. 8, the ground point A on the right lane line WLr in the reference image of the camera 2a is captured at a position Al' that has moved downward in the image with respect to the original corresponding position Al in the comparative image of the camera 2b. Likewise, the ground point B is captured at a position B2 that has moved downward in the image with respect to the original corresponding position Bl.

Thus, when the camera 2b has moved upward with respect to the camera 2a, the position Al, which a true corresponding point of the comparative image with respect to the ground point A on the coordinate j1 of the reference image, moves to the coordinate j1a (j1a<j1). Further, the position Bl, which a true corresponding point of the comparative image with respect to the ground point B on the coordinate j2 of the reference image, moves to the coordinate j2b (j2b<j2). Therefore, the true epipolar line is shifted and inclined with respect to the original horizontal line.

However, since stereo matching is implemented by assuming that the epipolar line is located on the horizontal line, a parallax da' is calculated by assuming that the point of the comparative image corresponding to the ground point A at the j1 coordinate of the reference image is at the position A2 on the same j1 coordinate, and a parallax db' is calculated by assuming that the point of the comparative image corresponding to the ground point B at the j2 coordinate of the reference image is at the position B2 on the same j2 coordinate. As a result, the parallax da' of the ground point A of the right lane line is calculated to be less than the original parallax da, the parallax db' of the ground point B of the left lane line is calculated to be larger than the original parallax db, and the relationship between the image vertical coordinate and parallax has different characteristics which do not match on the left and right lane line s, as depicted in FIG. 9.

Figure 9:
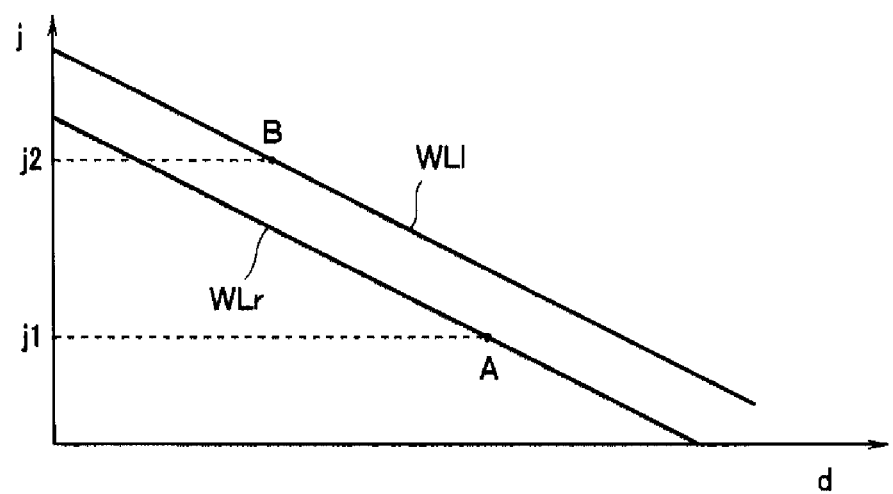
FIG. 9 is an explanatory drawing illustrating a parallax of left and right lane lines determined from the reference image and comparative image depicted in FIG. 8.
Figure 10:
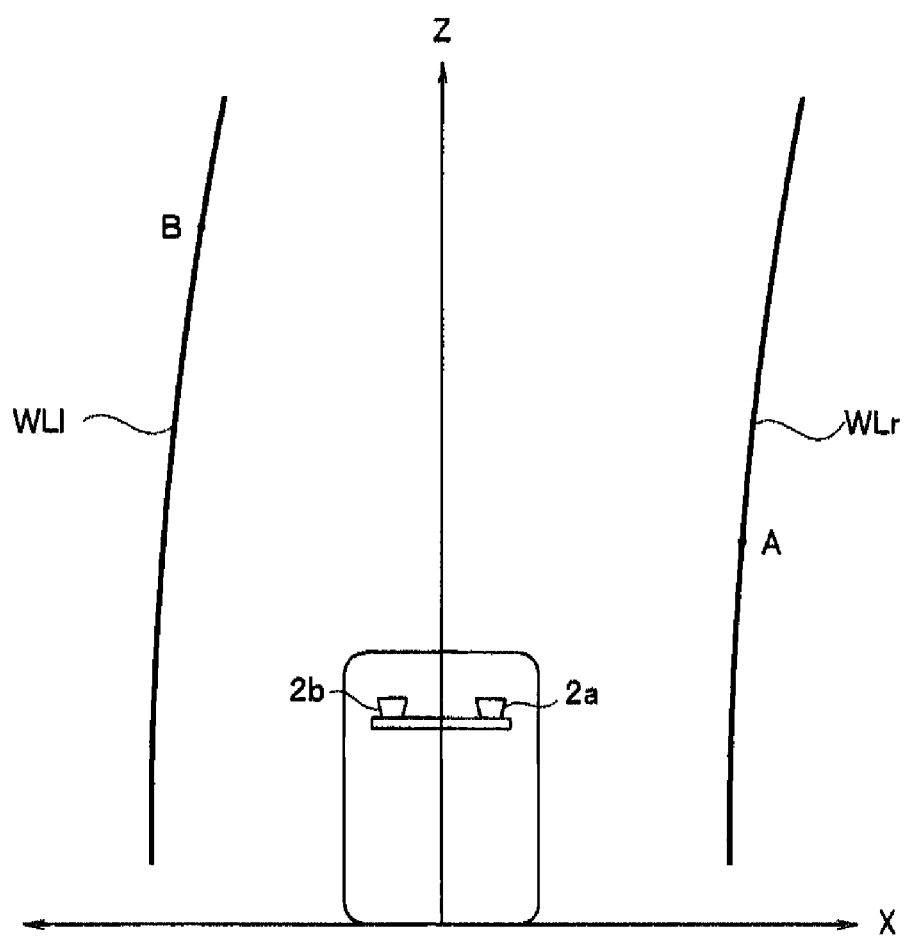
FIG. 10 is an explanatory drawing illustrating lane lines recognized from the reference image and comparative image depicted in FIG. 8.

In the relationship between the image vertical coordinate and parallax depicted in FIG. 9, the parallax of the right lane line WLr is less (farther) than the parallax of the left lane line WLl on the horizontal line with the same j-coordinate value, and the j-coordinate value of the right lane line WLr is less than the j-coordinate value of the left lane line WLl at the same parallax value. Where the lane line approximating equations are generated by determining the distance z in the real space and the coordinate value x in the vehicle width direction from such a relationship, the lane line shape such as shown in FIG. 10 is obtained, and the left and right lane lines, which are inherently of a straight shape, are erroneously recognized as having a shape curved to the right in the advance direction.

Therefore, in the camera displacement diagnosis module 10, a difference $\Delta jd$ between the j-coordinate value of the left lane line and the j-coordinate value of the right lane line giving the same parallax is calculated as a diagnostic value based on the difference in parallax between the left and right lane lines on the same horizontal line. Where the diagnostic value $\Delta jd$ is compared with a threshold thj which is a preset allowed value of camera displacement, a normal state is determined when the condition of $\Delta jd \leq thj$ is fulfilled, and it is determined that a camera displacement has occurred when the condition of $\Delta jd > thj$ is fulfilled.

The diagnostic value $\Delta jd$ is calculated, for example, by taking an average value for a predetermined number of frames correspondingly to a parallax corresponding to any distance, or a parallax in a plurality of ground points such as at a small distance, a medium distance, and a large distance. Further, depending on conditions, a difference in parallax between the left and right lane lines on the same horizontal line can be directly used as the diagnostic value.

Figure 11:
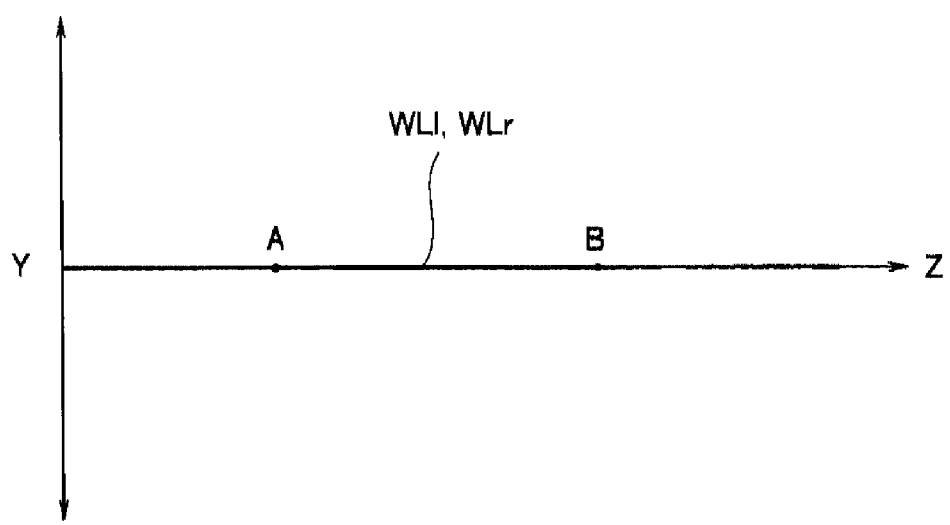
FIG. 11 is an explanatory drawing illustrating the height of left and right lane lines determined from the reference image and comparative image depicted in FIG. 5.

(b) Diagnostic Value Determined by Difference in Height Between Left and Right Lane Lines As explained hereinabove with reference to FIG. 6, when no camera displacement has occurred, the parallax of the left lane line WLl and the parallax of the right lane line WLr have the same value in the same ground point (horizontal line with the same j-coordinate value). Therefore, where the relationship between the distance z and height y of the left and right lane lines WLl and WLr is calculated as a first-order relationship by the aforementioned Equations (7) and (8), as shown in FIG. 11, the height of the ground points A and B is the same, the inclinations al and ar of the straight lines representing the relationship between the height and the distance become 0 (flat road), the height y is constant with respect to the distance z, and the same height is obtained for the left and right lane lines WLl and WLr.

Meanwhile, where a displacement has occurred (the camera 2b has shifted upward with respect to the camera 2a), as shown in FIG. 9, the parallax of the right lane line WLr is less than the parallax of the left lane line WLl on the horizontal line with the same j-coordinate value, and the j-coordinate value of the right lane line WLr is less than the j-coordinate value of the left lane line WLl at the same parallax value. Therefore, in the relationship between the height y and distance z in the real space of the left and right lane lines WLl and WLr, as depicted in FIG. 12, the relationship between the height and distance of the left lane line WLl and the right lane line WLr is represented by straight lines having respective predetermined inclinations, and the left lane line WLl is calculated to be higher than the right lane line WLr at the same distance.

Therefore, a difference $\Delta$yd between the height of the left lane line and the height of the right lane line at the same distance is calculated as a diagnostic value based on the difference in parallax between the left and right lane lines in the same horizontal line, and whether or not a camera displacement has occurred is determined. Where the diagnostic value $\Delta$yd is compared with a threshold thy which is a preset allowed value of camera displacement, a normal state is determined when the condition of $\Delta$yd$\leq$thy is fulfilled, and it is determined that a camera displacement has occurred when the condition of $\Delta$yd>thy is fulfilled.

In this case, the diagnostic value $\Delta$yd is also calculated, for example, by taking an average value for a predetermined number of frames correspondingly to a parallax corresponding to any distance, or a parallax in a plurality of ground points such as at a small distance, a medium distance, and a large distance.

Figure 12:
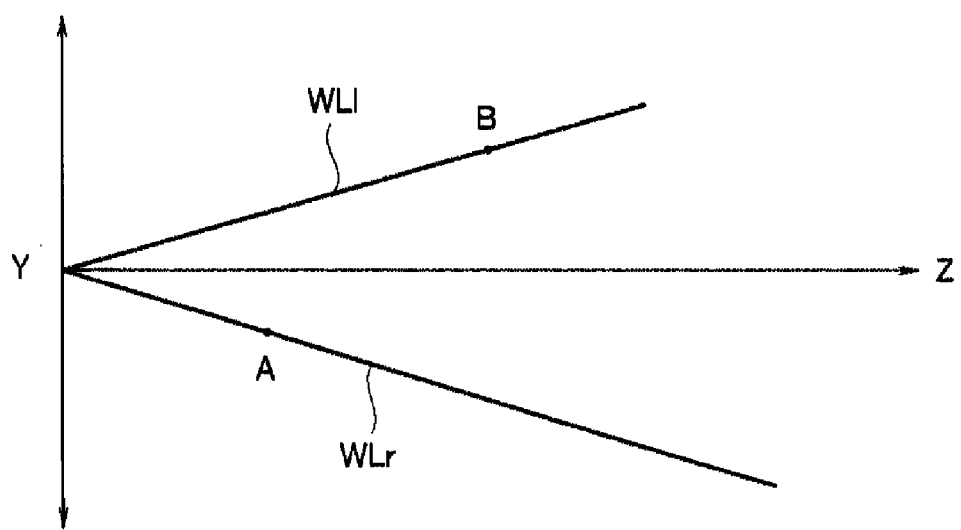
FIG. 12 is an explanatory drawing illustrating the height of left and right lane lines determined from the reference image and comparative image depicted in FIG. 8.

(c) Diagnostic Value Determined by Inclination of Straight Line Representing the Relationship Between Height and Distance of Lane Lines The relationship depicted in FIG. 12 means that when a camera displacement has occurred, the relationship between the height and distance of the left and right lane lines is represented by straight lines with inclinations al and ar, the road being flat. The upper limit values of the inclinations al and ar are determined by a front-rear gradient or a transverse gradient (cant) of the actual road, and the positive-negative polarities of the inclinations al and ar should be the same due to the actual road shape. Therefore, the occurrence of camera displacement can be determined by taking the inclinations al and ar as diagnostic values and comparing the upper limit values or polarities.

Thus, in the present embodiment, when it is determined whether a rotational or translational displacement has occurred between the cameras 2a and 2b constituting the stereo camera unit 2, the left and right lane lines of the road are used as references, and a diagnostic value based on a difference between the parallax of the left lane line and the parallax of the right lane line on the same horizontal line obtained by matching processing of the lane lines is calculated. Whether or not a displacement has occurred between the cameras 2a and 2b is determined by comparing the diagnostic value with a preset threshold.

As a result, vehicle control can be reliably prevented from failures resulting from using the recognition results of position information on lane lines or other vehicles in spite of the occurrence of a displacement in the stereo camera unit, and safety can be ensured.

In accordance with the present invention, the displacement of the stereo camera unit can be diagnosed when the subject vehicle is running, and the occurrence of vehicle control failures resulting from erroneous recognition caused by the displacement can be avoided.

The invention claimed is:

1. A stereo image processing device for a vehicle that processes images captured by a stereo camera unit installed on the vehicle and three-dimensionally recognizes a traveling environment, the device comprising:
    a left-right similar object detection module that detects a left side object present along a road and right side object which is present along the road and is similar to the left side object present as a pair on the left and right side of the vehicle from an image captured by the stereo camera unit, performs matching processing of the left side object and the right side object, and calculates a parallax of the left side object and a parallax of the right side object on a same horizontal line of the image; and
    a camera displacement diagnosis module that calculates a diagnostic value based on a difference between the parallax of the left side object and the parallax of the right side object on the same horizontal line, compares the diagnostic value with a preset threshold value, and diagnoses a vertical mechanical displacement in the stereo camera unit.

2. The stereo image processing device for a vehicle according to claim 1, wherein the left side object and the right side object are left and right lane lines on a road surface.

3. The stereo image processing device for a vehicle according to claim 1, wherein a coordinate value based on a parallax of the left side object at any point and a parallax of the right side object at any corresponding point and a coordinate value based on a distance of the left side object at the any point and a distance of the right side object at the any corresponding point is used as the diagnostic value.

4. The stereo image processing device for a vehicle according to claim 1, wherein a difference between a height of the left side object in a real space and a height of the right side object in the real space is used as the diagnostic value, the height of the left side object and the height of the right side object being determined based on the parallax at a same distance from the vehicle in the real space.

5. The stereo image processing device for a vehicle according to claim 2, wherein a difference between a height of the left side object in a real space and a height of the right side object in the real space is used as the diagnostic value, the height of the left side object and the height of the right side object being determined based on the parallax at a same distance from the vehicle in the real space.

6. The stereo image processing device for a vehicle according to claim 1, wherein an inclination of a straight line obtained by linearly approximating a relationship between the height and distance of each of the left side object and the right side object in a real space is used as the diagnostic value.

7. The stereo image processing device for a vehicle according to claim 2, wherein an inclination of a straight line obtained by linearly approximating a relationship between the height and distance of each of the left side object and the right side object in a real space is used as the diagnostic value.

8. The stereo image processing device for a vehicle according to claim 2, wherein a difference between a height of the left side object in a real space and a height of the right side object in the real space is used as the diagnostic value, the height of the left side object and the height of the right side object being determined based on the parallax at a same distance from the vehicle in the real space.

* * * * *